July 18, 1944.  P. DANIELSSON  2,353,654
METHOD AND MEANS FOR DRESSING FISH
Filed Dec. 1, 1942  3 Sheets-Sheet 1

Inventor
Paul Danielsson,
By Sommers + Young
Attorneys

July 18, 1944.  P. DANIELSSON  2,353,654
METHOD AND MEANS FOR DRESSING FISH
Filed Dec. 1, 1942   3 Sheets-Sheet 2
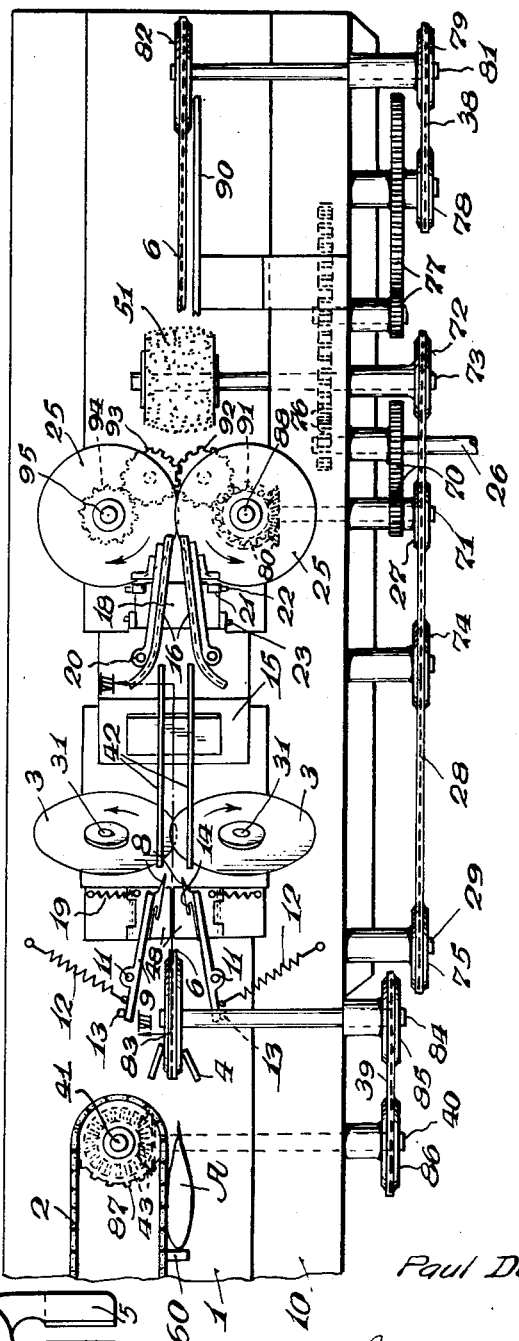
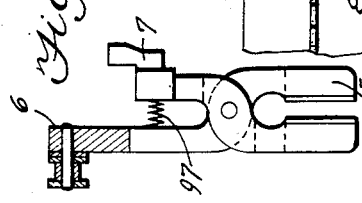
Inventor
Paul Danielsson,
By Sommers & Young
Attorneys

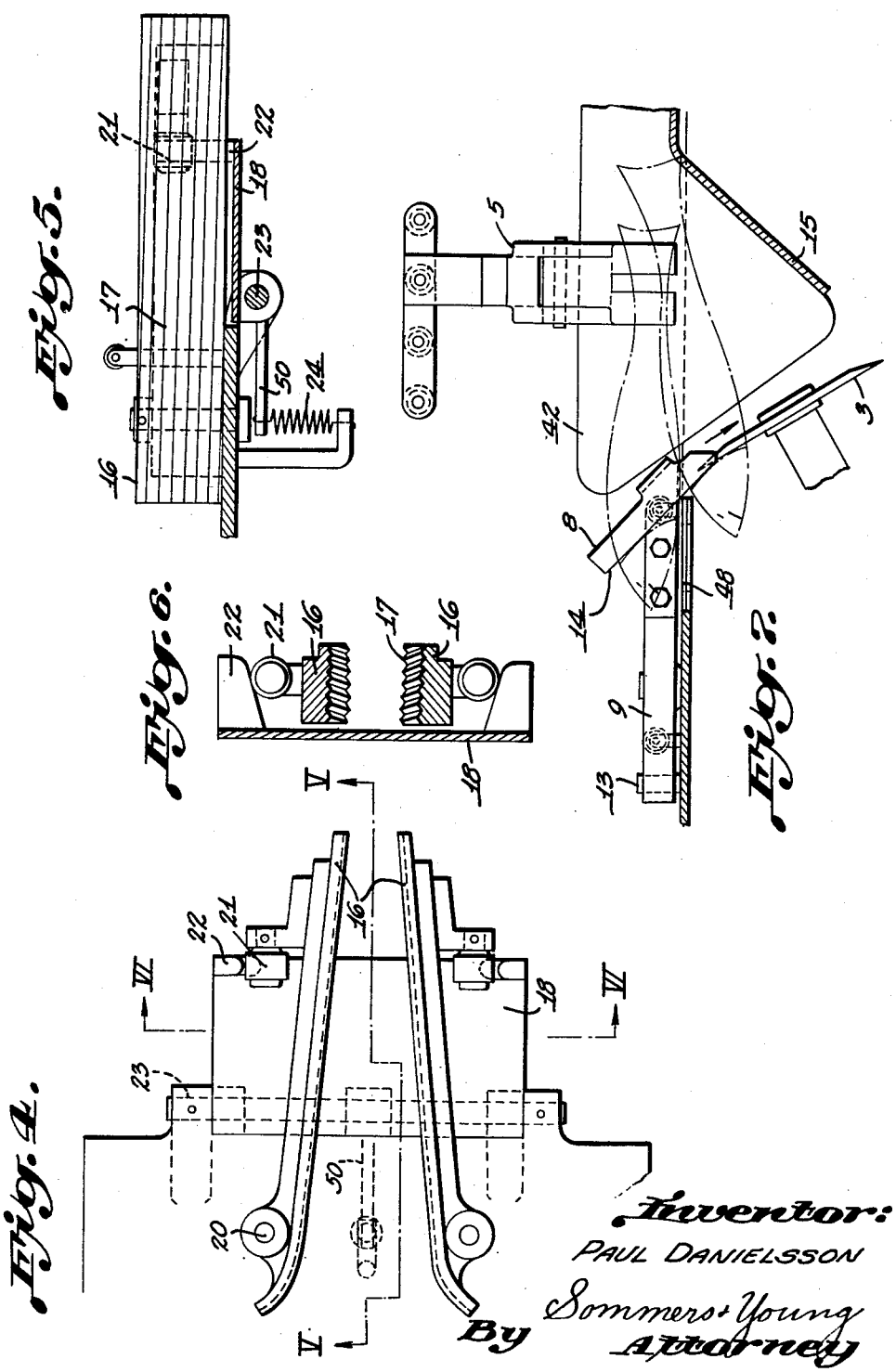

Patented July 18, 1944

2,353,654

UNITED STATES PATENT OFFICE 2,353,654

METHOD AND MEANS FOR DRESSING FISH

Paul Danielsson, Stockholm, Sweden, assignor to Arenco Aktiebolag, a Swedish joint-stock company Application December 1, 1942, Serial No. 467,496
In Sweden October 27, 1941

11 Claims. (Cl. 17—3)

This invention relates to the dressing of fish, and it is an object of the invention to decapitate the fish in such manner that waste parts, such as coronal bones and part of the belly adjacent to the head of the fish are removed without the loss of any valuable parts. Another object of the invention consists in the provision of simple and otherwise improved means for decapitating the fish when advanced longitudinally.

With these and other objects not specifically set forth in view, the invention consists in the method and construction as well as novel combination which will be hereinafter fully described and then particularly pointed out in the claims hereunto appended.

In the drawings—

Figs. 1 and 2 are a plan view and an elevational side view, respectively, of an embodiment of a fish dressing machine according to the invention.

Fig. 3 is a view on an enlarged scale taken on the line III—III of Fig. 1;

Fig. 4 is an enlarged plan view of some constructional features;

Fig. 5 is a sectional view taken on the line V—V of Fig. 4;

Fig. 6 is a sectional view taken on the line VI—VI of Fig. 4; and

Fig. 7 is an enlarged vertical sectional view taken on the line VII—VII of Fig. 2 and illustrating the decapitating of the fish.

Figure 1:
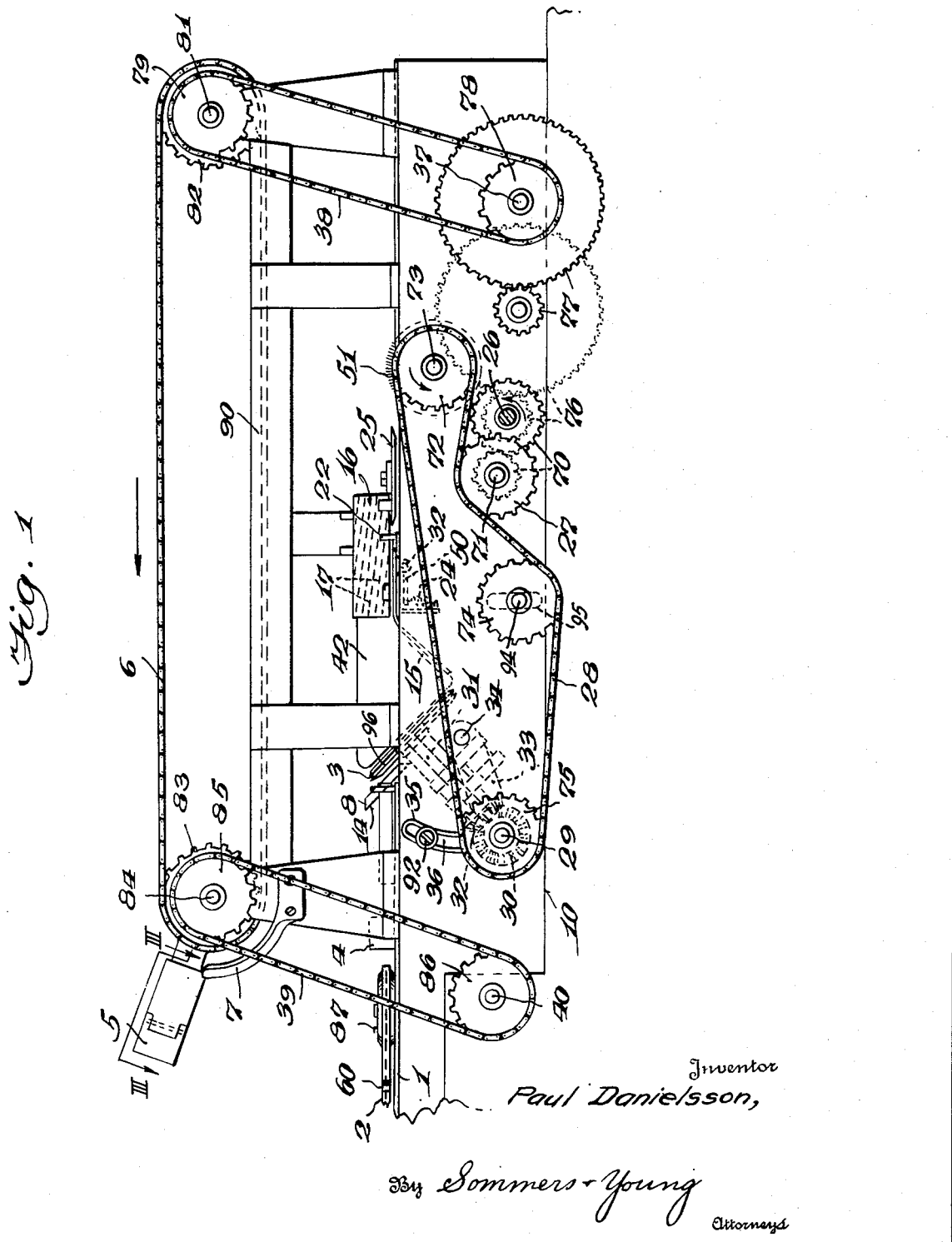

The fish A are successively placed on the table 1, so that their heads abut an impeller 60 of an endless conveyor 2, which moves stepwise or continuously. Thereby the belly of the fish is directed downwardly against two cooperating head cutters 3 between the overlapping cutting edges of which is left a gap 96 and the vertical angular position of which is adjustable. The conveyor 2 feeds the fish longitudinally through a guide 4, which is positioned below one end of a conveyor 6, provided with pincers 5 that are normally held apart by springs 97. The movements of the conveyors 2 and 6 are timed so that the pincers 5 coact with a curved guide bar 7 to close the pincers against the yielding resistance of the spring 93 and seize within the guide 4 the tail end of the fish and pull the fish between two inclined guide bars 8 towards the head cutters 3. When pulling the fish through the machine the pincers are maintained closed by a guide bar 90 that extends longitudinally of the machine. The guide bars 8 are located at opposite sides of the path of movement of the fish and converge in the fish feeding direction. They are each adjustably mounted on an arm 9, so that their angular positions can be adjusted in a vertical plane. The arms 9 are each secured to a pin 11, which is pivotally journalled in the machine frame 10. To the rear ends of the arms 9 are secured tension springs 12 attached to the machine frame and tending to move the bars 8 towards each other, which movement is limited by abutments 13. The guide bars 8 incline in the fish feeding direction, and their rear edges 14 are adapted to catch the fish behind the gill bones, the fish being advanced between the bars 8 on moving said bars apart against yielding resistance. Said rear edges 14 of the guide bars 8 are in the embodiment as illustrated adjusted into substantially the same vertical angular position as the cutters 3. Below the guide bars 8 two supporting plates 48 are pivotally journalled and held in horizontal position by tension springs 19. The heads of fish pulled forwards between the guide bars 8 are by said bars deviated downwardly (Fig. 7) and force the supporting plates 48 downwardly against the yielding resistance offered by the springs 19.

The cutters 3 are arranged at opposite sides of the path of movement of the fish and revolve continuously in opposite directions (Fig. 2), so that they tend to still more depress the head of the fish bent down by the guide bars 8. The cutters 3 for decapitating the fish perform a cut the direction of which is defined by the vertical angular positions of the cutters and guide bars. Preferably, the cut is oblique, so that the coronal bones as well as the valueless throat of the fish are severed from the body of the fish. The deviation of the head of the fish is limited by an inclined plate 15, which is also adapted to erect the fish, i. e., straighten same, after having been decapitated. Thereby the fish is pulled between two guide bars 42 and further between two pivoted plates 16, which on their inner sides have inclined flutes 17, which guide the body of the fish downwards against a downwardly yielding plate 18. The plates 16 are secured to pins 20 that are turnably journalled in the machine frame. Rollers 21 are loosely journalled on the outer sides of the plates 16 and engage oblique guides 22 on the plate 18. The plate 18 is pivotally mounted on a pin 23 and provided with an arm 50, which by means of a spring 24 is pulled down, whereby the rollers 21 are forced inwardly and move against a yielding resistance the guide plates 16 towards each other.

Immediately behind the guide plates 16 two horizontal circular cutters 25 are arranged, which revolve in opposite directions (Fig. 2). When a fish is pulled between the plates 16 and has been bent down somewhat by the flutes 17 the cutters 25 cut a strip out of the belly of the fish, which is opened thereby. On its continued forward movement the fish is moved over a revolving brush 51, which in a direction against the head end of the fish (Fig. 1) cleans the abdominal cavity of the latter.

For driving the various parts of the machine a rotary main shaft 26 is by means of gears 70 connected to a shaft 71, to which is keyed a sprocket 27 for driving a chain 28. The shaft 71 drives by means of bevel gears 80 a shaft 88, to which is keyed one of the circular cutters 25. The shaft 88 drives by means of gear wheels 91, 92, 93 and 94 another shaft 95, to which the other circular cutter 25 is secured. The chain 28 drives a sprocket 72 keyed to a rotary shaft 73, to which is secured the brush 51. Furthermore, the chain 28 runs over an adjustable tension sprocket 74 and drives a sprocket 75 secured to the shaft 29. The shaft 94 of the sprocket 74 is adjustable in a vertical slot 95 of the machine frame. To the shaft 29 are keyed two bevel gears 30 (one of which is shown in Fig. 1), directed against each other and each meshing with a bevel gear 32. The two bevel gears 32 are each keyed to a shaft 31, and to each of the shafts 31 is secured one of the circular cutters 3. The shaft 29 as well as the shafts 31 are journalled in arms 33, which are pivotally mounted each on a shaft 34. One of the two arms 33 has a head 35 provided with an arcuate slot 36 through which projects a set screw 92 for adjusting the angular position of the shaft 29 and thereby also that of the cutters 3. The driving shaft 26 drives by means of gearing 76, 77 a shaft 37, which by means of sprockets 78, 79 and a chain 38 drives a shaft 81, to which is secured a sprocket 82. The conveyor 6 runs over this sprocket and over a sprocket 83, secured to a rotatably journalled shaft 84. A sprocket 85 secured to the shaft 84 drives by means of a chain 39 a sprocket 86, which is secured to a rotatably journalled shaft 40, which by means of bevel gears 43 drives another shaft 41, to which is secured a sprocket 87 for driving the conveyor 2.

In the operation of the machine, the fish are successively seized at their tail ends by the pincers 5 and pulled longitudinally through the guide 4 and further between the guide bars 8. The fish behind their gill bones engage the guide bars 8 and are deviated downwardly against the revolving cutters 3 (Fig. 7). By the cutters 3 the head of the fish is cut off at the desired angle, but due to the gap between the cutters 3 the tough intestine is left uncut. Thereby the intestine will remain attached to the head of the fish, and when the body of the fish is moved further between the guide bars 42 the head of the fish together with the intestine are arrested by the cutters, so that the intestine is torn off the body of the fish. The head of the fish together with the intestine will then drop into a receptacle (not shown). The decapitated fish is moved further over the cutters 25, which open the body of the fish, whereafter the fish on its continued movement over the brush 51 is cleaned interiorly by the brush. At the right-hand end of the machine (Fig. 1) the pincers 5 is released by the bar 90, so that the pincers will open and the fish drops into a receptacle (not shown).

I claim:

1. The method of dressing fish, consisting in pulling the fish by their tail ends longitudinally and temporarily deviating the head of the fish against cutting means to decapitate the fish in transit.

2. The method of dressing fish, consisting in pulling the fish by their tail ends longitudinally and temporarily deviating the head of the fish against cutting means to decapitate the fish in transit, leaving its intestine uncut, and retaining the cut head of the fish to detach the intestine from the body of the fish when continuing its longitudinal movement.

3. The method of dressing fish, consisting in pulling the fish by their tail ends longitudinally and temporarily deviating the head of the fish against cutting means to decapitate the fish in transit, and cutting away a strip of the belly of the fish in transit on its further longitudinal movement from the cutting means.

4. In a device for dressing fish, a cutter, means for seizing the fish by their tail ends and conveying the fish longitudinally, and guide means for deviating the head end of the advancing fish against said cutter to decapitate the fish in transit.

5. In a device for dressing fish, a cutter, a conveyor having means for seizing the fish by their tail ends and conveying the fish longitudinally, a pair of guide bars directed obliquely to the path of movement of the fish and adapted to deviate the fish when pulled by said conveyor between said guide bars and guide the head end of the fish against said cutter for decapitating the fish in transit.

6. In a device for dressing fish, a conveyor having means for seizing the fish by their tail ends and conveying the fish longitudinally, a pair of cutters arranged at opposite sides of the path of movement of the fish and being directed obliquely thereto, and guide means directed obliquely to said path of movement and substantially in the same direction as said cutters, said guide means being adapted to deviate the heads of the fish against said cutters to decapitate the fish in transit.

7. In a device for dressing fish, a pair of cooperating cutters, means for seizing the fish by their tail ends and conveying the fish longitudinally, guide means for deviating the head end of the advancing fish against said cutters to decapitate the fish in transit, a gap being left between the cutting edges of said cutters to obviate cutting of the intestine and to allow same to enter said gap while the cut head of the fish is retained by said cutters.

8. In a device for dressing fish, a cutter, means for seizing the fish by their tail ends and conveying the fish longitudinally, and guide means for deviating the head end of the advancing fish against said cutter to decapitate the fish in transit, said guide means consisting of a pair of bars that are arranged at opposite sides of the path of movement of the fish and directed obliquely to said path of movement.

9. In a device for dressing fish, a cutter, means for seizing the fish by their tail ends and conveying the fish longitudinally, and guide means for deviating the head end of the advancing fish against said cutter to decapitate the fish in transit, said guide means comprising a plate for yieldingly supporting the head of the fish, when being deviated against said cutter.

10. In a device for dressing fish, a cutter, means for seizing the fish by their tail ends and conveying the fish longitudinally, guide means for deviating the head end of the advancing fish against said cutter to decapitate the fish in transit, and guide means for straightening the fish when leaving the cutter.

11. In a device for dressing fish, a cutter, means for seizing the fish by their tail ends and conveying the fish longitudinally, guide means for deviating the head end of the advancing fish against said cutter to decapitate the fish in transit, and means for peeling off a strip of the belly of the fish when leaving said cutter.

PAUL DANIELSSON.